United States Patent
Lohrentz et al.

(10) Patent No.: US 9,532,497 B2
(45) Date of Patent: Jan. 3, 2017

(54) VARIABLE PRECHARGE ACCUMULATOR FOR AGRICULTURAL HEADER

(71) Applicant: AGCO Corporation, Hesston, KS (US)

(72) Inventors: Randy Lohrentz, Buhler, KS (US); Emmanuel R. Magisson, Newton, KS (US)

(73) Assignee: AGCO Corporation, Duluth, GA (US)

(*) Notice: Subject to any disclaimer, the term of this patent is extended or adjusted under 35 U.S.C. 154(b) by 73 days.

(21) Appl. No.: 14/398,026

(22) PCT Filed: May 2, 2013

(86) PCT No.: PCT/US2013/039216
§ 371 (c)(1),
(2) Date: Oct. 30, 2014

(87) PCT Pub. No.: WO2014/178868
PCT Pub. Date: Nov. 6, 2014

(65) Prior Publication Data
US 2016/0106021 A1    Apr. 21, 2016

Related U.S. Application Data

(60) Provisional application No. 61/641,692, filed on May 2, 2012.

(51) Int. Cl.
*A01D 41/16* (2006.01)
*A01B 61/04* (2006.01)
(Continued)

(52) U.S. Cl.
CPC ............ *A01B 63/10* (2013.01); *A01B 61/046* (2013.01); *A01D 41/14* (2013.01); *A01D 41/145* (2013.01); *A01D 69/03* (2013.01); *A01D 2101/00* (2013.01)

(58) Field of Classification Search
CPC .... A01D 41/145; A01D 41/141; A01D 47/00; A01D 34/246; A01D 41/14; A01B 61/046; A01B 61/048
(Continued)

(56) References Cited

U.S. PATENT DOCUMENTS 3,717,995 A    2/1973  Case
4,733,523 A *  3/1988  Dedeyne ............ A01D 75/287
                                              56/10.2 E
(Continued)

FOREIGN PATENT DOCUMENTS

EP    1721507 A1    11/2006
EP    2172095 A2    4/2010

OTHER PUBLICATIONS

European Patent Office, International Search Report for International Patent Application No. PCT/US2013/039216; mailing date Aug. 23, 2013.

Primary Examiner — John G Weiss (57) ABSTRACT

A harvesting header for use with a crop harvesting machine has a feederhouse interface and a header frame providing structural support for the harvesting header. A pivotable connection between the feederhouse interface and the header frame enable the header frame to pivot with respect to the feederhouse interface. At least one hydraulic ram connects between the feederhouse interface and the header frame to pivot the harvesting header on the feederhouse interface. A hydraulic supply provides pressurized hydraulic fluid to the hydraulic ram. An accumulator assembly fluidically connects between the hydraulic supply and the at least one hydraulic ram. The accumulator assembly has a precharge fluid/gas interface between a gas chamber and the hydraulic supply, and a working fluid/gas interface between the gas chamber and the at least one hydraulic ram.

6 Claims, 6 Drawing Sheets

(51) Int. Cl.
 *A01B 63/10* (2006.01)
 *A01D 69/03* (2006.01)
 *A01D 41/14* (2006.01)
 *A01D 101/00* (2006.01)

(58) Field of Classification Search
 USPC ....... 56/10.4, 10.2 F, 11.9, 15.8; 60/413–418
 See application file for complete search history.

(56) References Cited

U.S. PATENT DOCUMENTS

| | | | | |
|---|---|---|---|---|
| 5,964,077 | A * | 10/1999 | Guinn | A01D 41/14 56/10.2 E |
| 7,269,944 | B2 * | 9/2007 | Zhang | E02F 9/2217 60/414 |
| 8,079,204 | B2 * | 12/2011 | Coers | A01D 41/14 56/15.8 |
| 8,881,495 | B2 * | 11/2014 | Lohrentz | A01D 47/00 56/10.2 E |
| 9,043,955 | B2 * | 6/2015 | Nafziger | A01D 47/00 |
| 2006/0075750 | A1 * | 4/2006 | Evans | B66F 9/22 60/416 |

* cited by examiner

VARIABLE PRECHARGE ACCUMULATOR FOR AGRICULTURAL HEADER

BACKGROUND OF THE INVENTION

1. Field of Invention

This invention relates to a pivotable harvesting header for a combine harvester, and more particularly, to a pivotable header with a hydraulic accumulator that can be adjusted for differing field conditions.

2. Description of Related Art

Agricultural harvesters such as combines are typically equipped with a harvesting header. For example, corn headers are specifically designed to pick corn and vary in size from two-row units to twelve-row units or more. As the harvester moves through the field, each row-unit passes between rows of corn. Corn header row units typically use gathering chains to covey crop material and ears rearward toward a cross auger. A set of driven snap rolls, which rotate based on the speed of the harvester, grabs the corn stalks and forces them downward between stripper plates. The ears of corn are snapped free of the stalk and the cross auger passes the ears to the feeder housing of the harvester.

The height of the harvesting header typically may be adjusted by pivoting or rotating the feederhouse upwardly and downwardly about a rotational axis adjacent a rearward end thereof. However, corn headers are typically fixed on the feederhouse at a selected fore and aft angle. It would also be desirable to adjust the fore/aft pitch of the header on the feederhouse to optimize crop cutting and feeding into the combine.

OVERVIEW OF THE INVENTION

In one embodiment, the invention is directed a harvesting header and feederhouse for use with a crop harvesting machine. The harvesting header has a feederhouse interface at the end of the feederhouse and a header frame providing structural support for the harvesting header. The header frame has a top beam, a bottom beam, and first and second vertical main structures connecting the top and bottom beams. A pivotable connection between the feederhouse interface and the vertical main structures of the header frame enable the header frame to pivot with respect to the feederhouse interface. At least one hydraulic ram connects between the feederhouse interface and the header frame to pivot the harvesting header on the feederhouse and a hydraulic supply provides pressurized hydraulic fluid to the at least one hydraulic ram. The hydraulic system also has an accumulator assembly fluidically connected between the hydraulic supply and the at least one hydraulic ram. The accumulator assembly has a precharge fluid/gas interface between a gas chamber and the hydraulic supply, and a working fluid/gas interface between the gas chamber and the at least one hydraulic ram.

These and other features and advantages of this invention are described in, or are apparent from, the following detailed description of various exemplary embodiments of the systems and methods according to this invention.

BRIEF DESCRIPTION OF THE DRAWINGS

The above mentioned and other features of this invention will become more apparent and the invention itself will be better understood by reference to the following description of embodiments of the invention taken in conjunction with the accompanying drawings, wherein.

Corresponding reference characters indicate corresponding parts throughout the views of the drawings.

DESCRIPTION OF EXAMPLE EMBODIMENTS

The present invention is susceptible of embodiment in many different forms. While the drawings illustrate and the specification describes certain preferred embodiments of the invention, it is to be understood that such disclosure is by way of example only. There is no intent to limit the principles of the present invention to the particular disclosed embodiments. References hereinafter made to certain directions, such as, for example, "front", "rear", "left" and "right", are made as viewed from the side of the combine.

Figure 1:
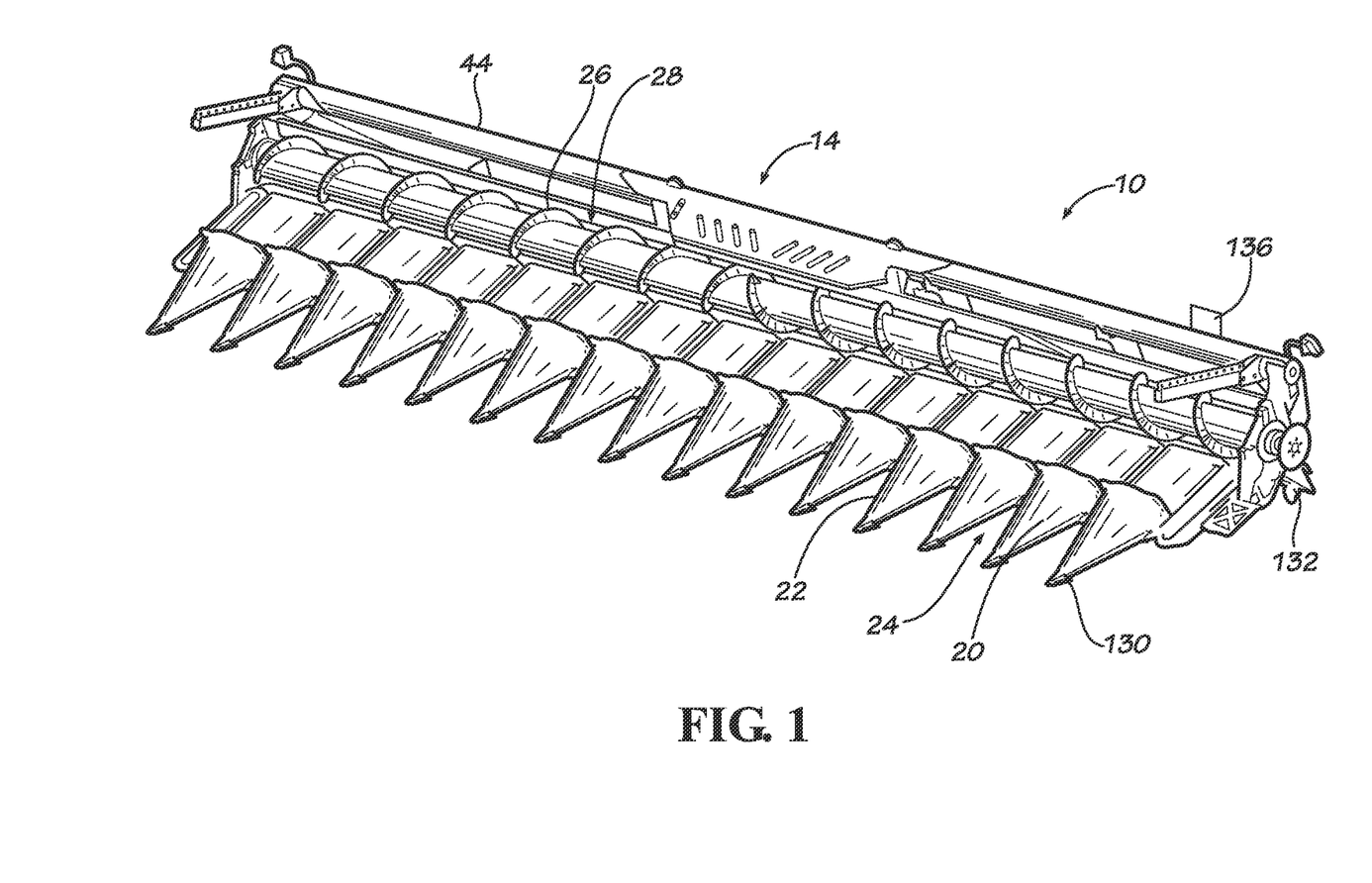
FIG. 1 is a perspective view of a harvester header for use with a harvesting machine.

Referring now to the drawings, and particularly to FIG. 1, a harvesting header for use with an agricultural combine harvester (not shown) is seen generally at 10. As is known in the art, the harvesting header 10 is mounted in a cantilevered manner on a feederhouse 12 (FIG. 2) of the combine harvester at a center area 14 of the harvesting header 10. The illustrated harvesting header 10 shown herein is a corn header designed to harvest multiple rows of corn simultaneously. However, one skilled in the art will understand that harvesting headers 10 for use in harvesting other crops may utilize concepts described herein without departing from the scope of the invention. As is known in the art, the height of the harvesting header 10 may be adjusted by pivoting or rotating the feederhouse 12 upwardly and downwardly about a rotational axis adjacent a rearward end thereof. Accordingly, the front end of the feederhouse 12 moves along an arc as the feederhouse 12 is rotated about the rearward axis. The feederhouse 12 is supportable in any suitable manner known in the art, such as using one or more fluid cylinders (not shown) extendable and retractable for pivotally rotating feederhouse 12 about its axis for raising and lowering the harvesting header 10.

Row units 20 that may be of conventional construction are arranged in side-by-side relationship on the harvesting header 10. Although sixteen row units 20 are shown here, the harvesting header 10 may have any number of such units, in side-by-side relationship, across its width. Each row unit 20 is desirably constructed and operated in a substantially identical manner through any known means. The row units 20 may have a removable snout or divider 22 hingedly coupled to the front of each of the row units 20. As is known in the art, corn stalks are drawn into slots 24 formed by the row units 20, such as with gathering chains (not shown). Snapping rolls (not shown) pull the corn stalks downwardly through the slot 24 and the ears of corn are stripped off of the stalks as the stalks are pulled downwardly between them. Ears of corn are stripped from each of the stalks and carried by an auger 26 in a trough 28 toward the feederhouse 12. The collected ears are then carried rearwardly and upwardly into a threshing assembly (not shown) of the combine harvester as known in the art.

Figure 2:
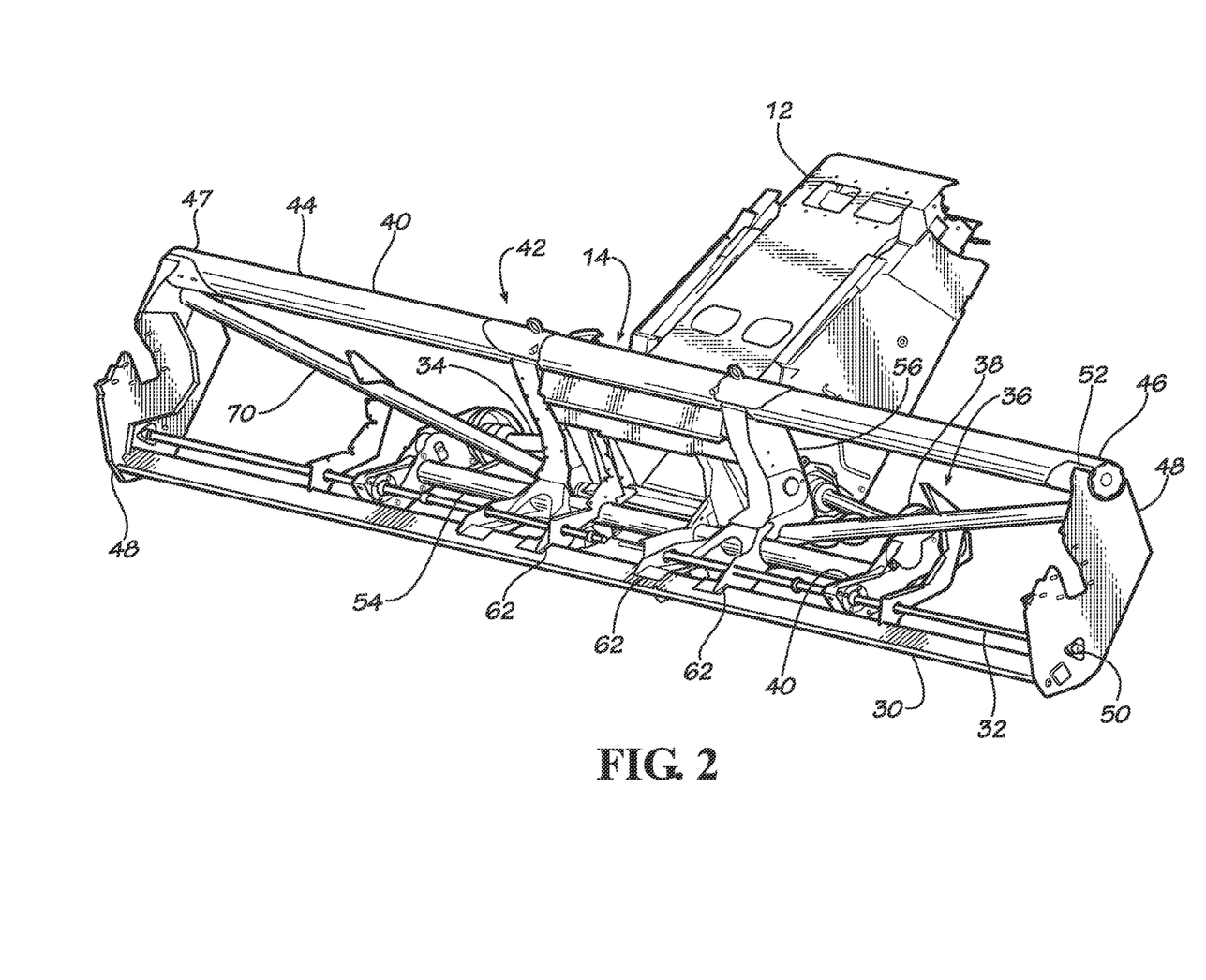
FIG. 2 is a front perspective view of a portion of the harvesting header of FIG. 1 with parts broken away to reveal internal details of the header frame.

Turning also now to FIG. 2, the row units 20 are mounted on a tool bar 30 that extends transversely across the width of the header 10. The gathering chains and snapping rolls are driven by a rotating row unit shaft 32 which extends transversely of the units over the width of the harvesting header 10. The row unit shaft 32 is drivingly connected to each row unit 20 through any known gear box assembly (not shown). The row unit shaft 32 is driven by a power take-off (PTO) shaft 34 through a header drive system 36. In one embodiment, the header drive system 36 includes a pair of substantially identical drive assemblies 38. Each drive assembly 38 includes a cog belt (not shown) housed in a belt case 40 to transfer power from PTO shafts 34 extending from opposing sides of the feederhouse 12 to the row unit shaft 32. However, one skilled in the art will understand that the header drive system 36 may utilize any other chain or gearbox assembly without departing from the scope of the invention.

In the illustrated embodiment, the harvesting header 10 has a header frame 42 with a top beam 44 which extends across an upper-rear portion of the harvesting header 10. The top beam 44 has ends 46 and 47 arranged at opposite ends of the harvesting header 10 such that the top beam 44 extends substantially the full width of the harvesting header 10. The top beam 44 provides the main structural support for the header frame 42 and desirably is a round tube that provides suitable resistance to torque. The header frame 42 further includes end panels 48 attached to the ends 46 and 47 of the top beam 44. Desirably, the top beam 44 is welded to gussets 52 on the end panels 48 using sound engineering judgment. The end panels 48 provide support for the tool bar 30 which extends parallel to and spaced forwardly of the top beam 44. End panels 48 also provide rotational support for the row unit shaft 32 with bearings 50.

The header frame 42 also has a bottom beam 54 extending across a portion of the width of the header that is generally parallel to and below the top beam 44. Desirably, the bottom beam 54 also is a round tube that provides suitable resistance to torque. The bottom beam 54 has a midpoint generally in the center area 14 of the harvesting header 10. Desirably, the bottom beam 54 does not extend the full width of the harvesting header 10 and the top beam 44 and bottom beam 54 are continuous through the center area 14. However, one skilled in the art will understand that other structure for the header frame 42 may be used using sound engineering judgment without departing from the scope of the invention.

The header frame also has a pair of vertical main structures 56 that in the illustrated embodiment connect the top beam 44 and the bottom beam 54 and form the center area 14 where the feederhouse 80 connects to the harvesting header 10. The vertical main structures 56 pivotably connect the harvesting header 10 with the feederhouse 12. Desirably, the top beam 44 and bottom beam 54 are continuous through the center area 14 of the harvesting header 10. By continuous through the center area 14, it is meant that the top beam 44 and the bottom beam 54 are continuous members that extend through the center area 14 and out at least partially towards the end panels 48 of the header frame 42.

Desirably, one vertical main structure 56 is attached to the bottom beam 54 a distance away from the midpoint of the bottom beam 54 toward a first end 58 of the bottom beam 54, and the second vertical main structure 56 is attached to the bottom beam 54 a substantially equal distance from the midpoint but toward an opposing end 59 of the bottom beam 54. Desirably, the bottom beam 54 has a width that is between about 25 percent to about 75 percent of the width of the harvesting header 10. In one embodiment, ends 58, 59 of the bottom beam 54 extend past the vertical main structures 56 and header drive assemblies 38 are arranged at opposite ends 58 of the bottom beam 54. Likewise, the first vertical main structure 56 is attached to the top beam 44 a distance away from the midpoint of the top beam 44 toward the end 46 of the top beam 44, and the second vertical main structure 56 is attached to the top beam 44 the same distance from the midpoint of the top beam 44 but toward the opposing end 47 of the top beam 44. Suitable gusset plates 60 are used in welding the vertical main structures 56 to the top beam 44 and bottom beam 54. Connecting plates 62 extend from the vertical main structures 56 and support the tool bar 30.

Diagonal truss members 70 connect the top beam 44 and the bottom beam 54. In the illustrated embodiment, diagonal truss members 70 connect the outer ends 46. 47 of the top beam 44 with the bottom beam 54. In one embodiment, outer ends of the diagonal truss members 70 are structurally connected to respective ends of the top beam 44, and inner ends of the diagonal truss members 70 are structurally connected adjacent respective interfaces of the bottom beam 54 and the vertical main structures 56. By "structurally connected", it is meant that the diagonal truss members 70 are joined either directly or indirectly with suitable gusset plates using sound engineering judgment. Desirably, the components are welded together using suitable gusset plates. The header frame 42 further comprises two inner support plates 72, each of which is attached to a diagonal truss member 70 so as to be supported thereby. Each of the inner support plates 72 supports the tool bar 30.

Figure 3:
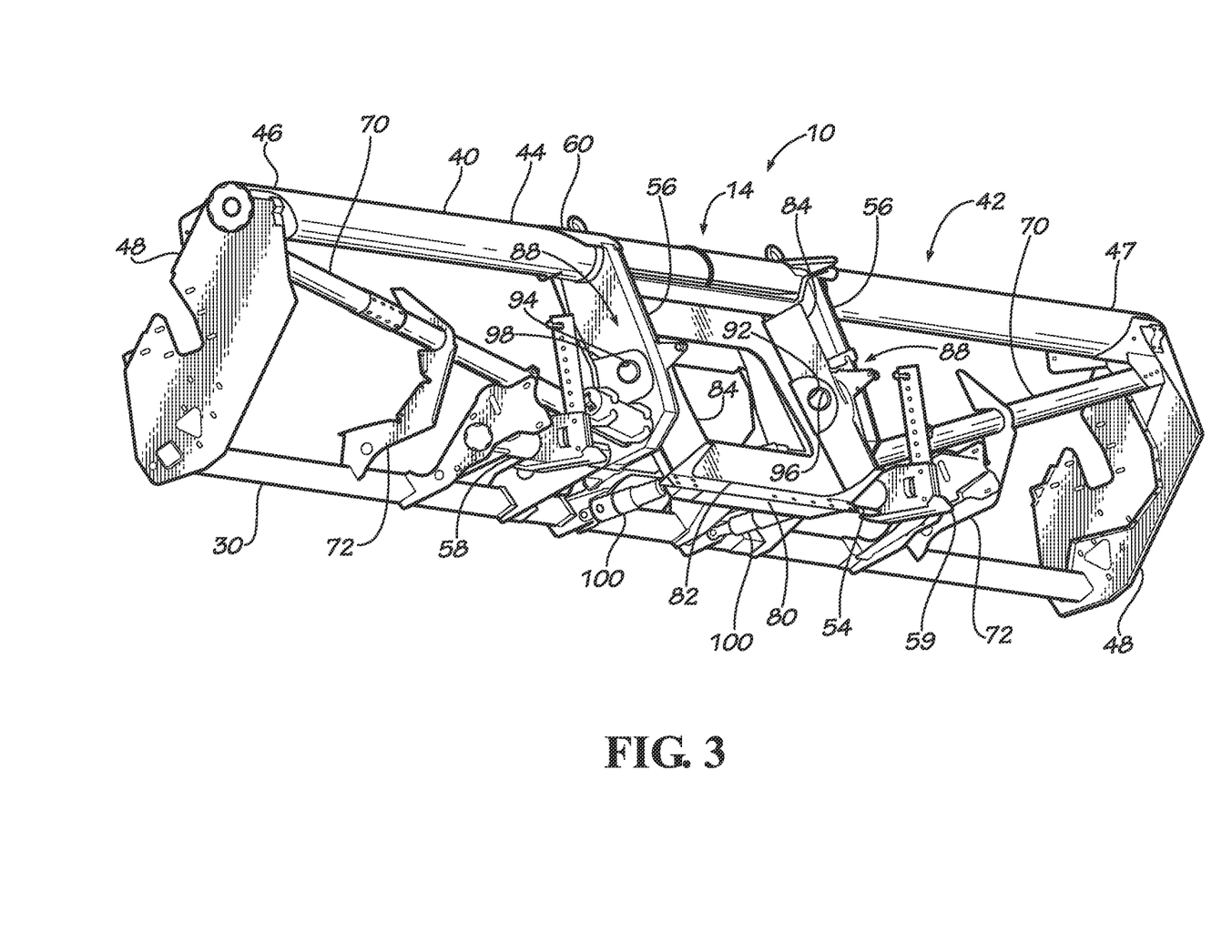
FIG. 3 is a rear perspective view of a portion of the harvesting header of FIG. 1 with parts broken away to reveal internal details of the header frame.
Figure 4:
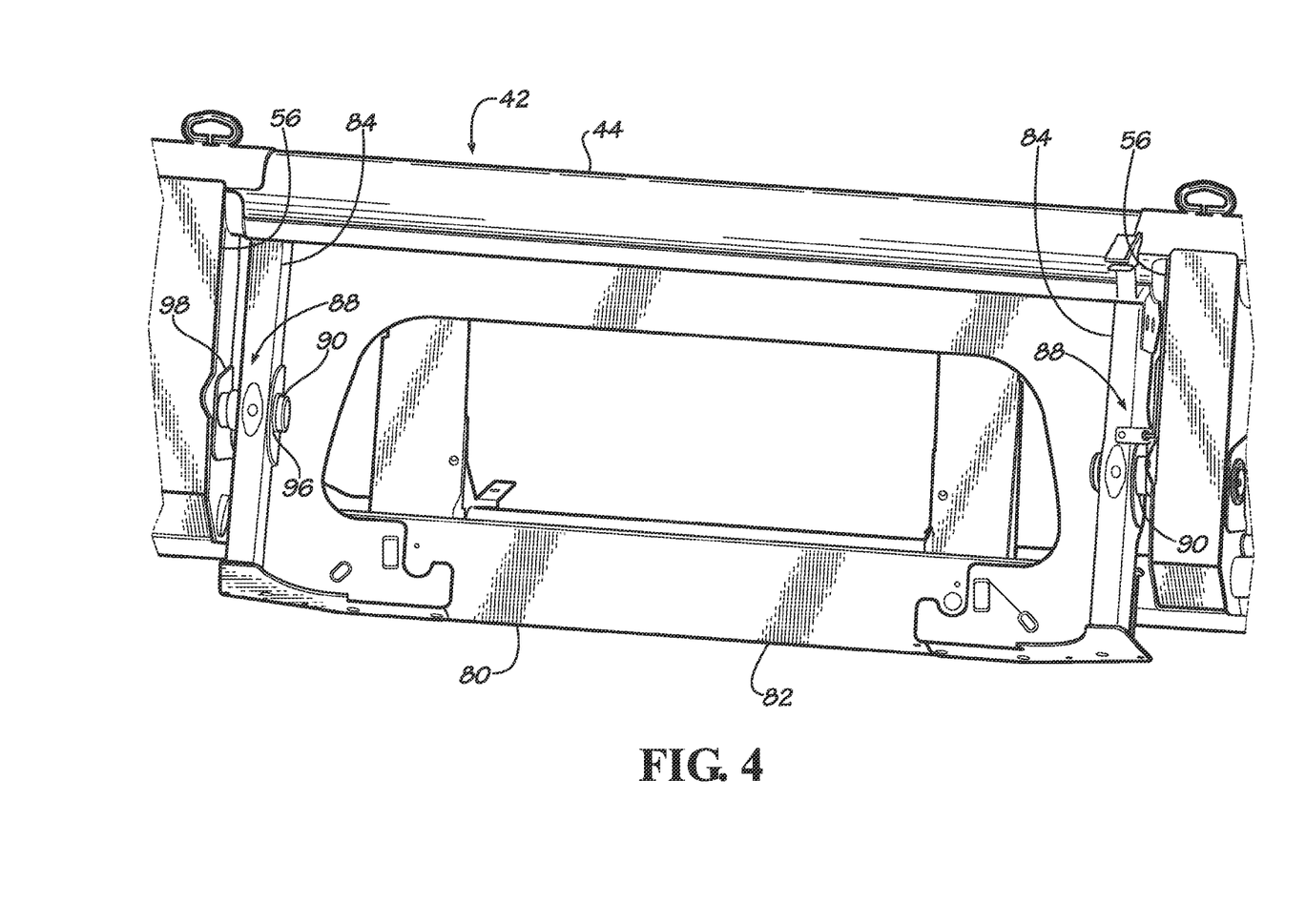
FIG. 4 is an enlarged rear perspective view of a portion of the harvesting header of FIG. 3.

According to the invention, the header frame 42 of the harvesting header 10 is pivotably connected to a feederhouse interface 80 located at a front end of the feederhouse 12. FIGS. 3 and 4 show the header frame 42 mounted to the feederhouse interface 80 with the remainder of the feederhouse 12 removed for clarity. In one embodiment, the feederhouse interface 80 has an interface plate 82 with mounting flanges 84 at its outer sides. The interface plate 82 can be mounted to the forward portion of the feederhouse 12 using any known means using sound engineering judgment. Desirably, the mounting flanges 84 extend rearwardly from the interface plate 82 and are positioned such that they fit inside and adjacent the vertical main structures 56 of the header frame 42. In the illustrated embodiment, each vertical main structure 56 attaches its adjacent mounting flange 84 with a pivotable connection 88. In the illustrated embodiment, the pivotable connection 88 includes a pivot pin 90 disposed in a first cylindrical bore 92 passing through the mounting flange 84 and a second cylindrical bore 94 passing through the vertical main section 56. Desirably, suitable bushings 96 are received in the first and second bores 92, 94. In the illustrated embodiment, brackets 98 fixedly disposed on the vertical main sections 56 are used to fix outer ends of the pivot pins 90 to the vertical main sections 56, while the pivot pins 90 are free to rotate with respect to the mounting flanges 84 so that pivotable movement of the header frame 42 on the feederhouse interface 80 may be obtained. Alternately, the pivot pins 90 may be fixedly disposed with respect to the mounting flanges 84 while being free to rotate with respect to the vertical main sections 56. Additionally, one skilled in the art will understand that the header frame 42 may be pivotably coupled to the feederhouse interface 80 in other manners using sound engineering judgment.

Figure 5:
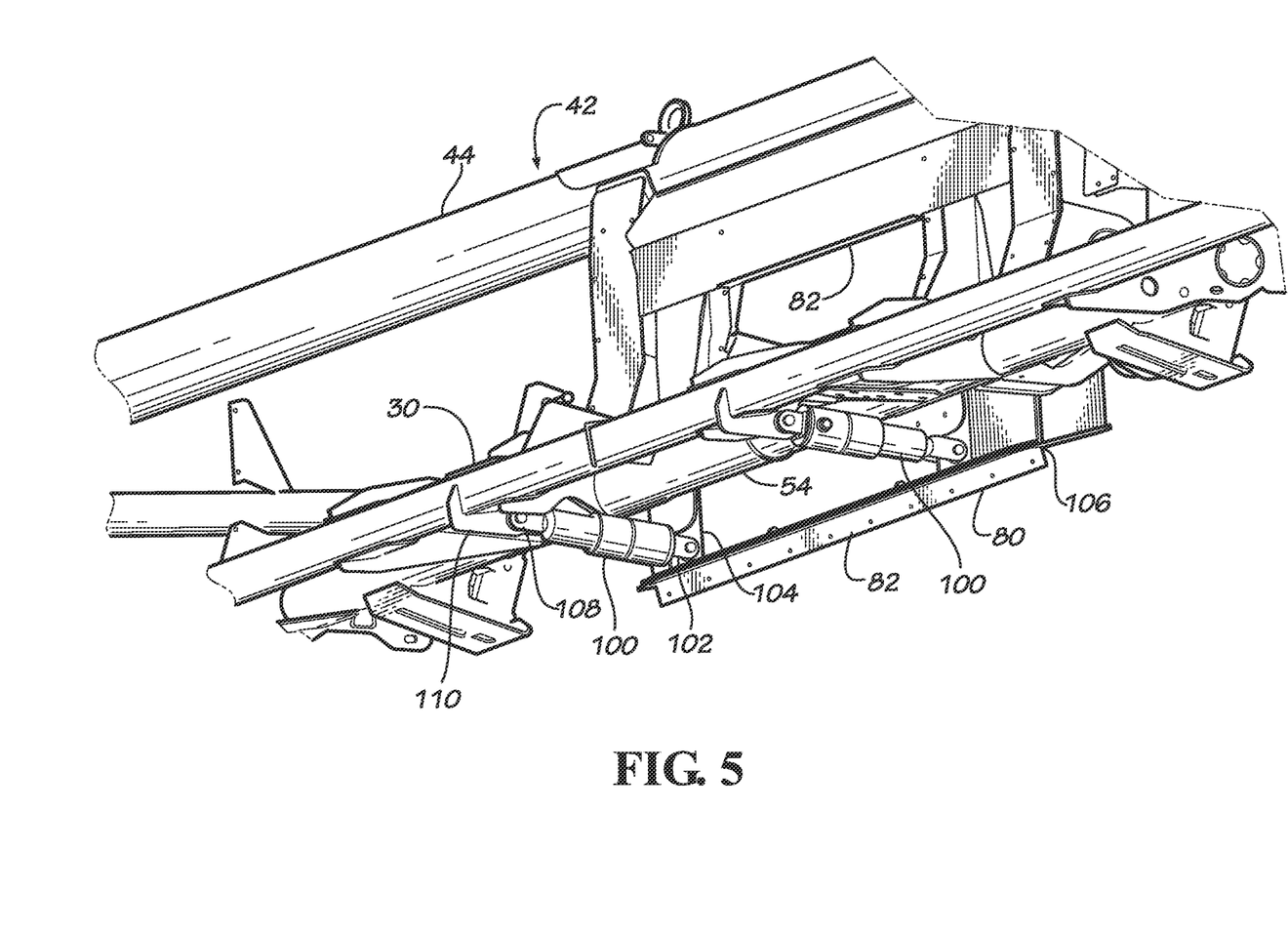
FIG. 5 is a perspective view of a portion of the underside of the harvesting header of FIG. 3.

Turning now to FIG. 5, at least one hydraulic working ram 100 connects between the feederhouse interface 80 and the header frame 42 to control pivoting motion of the harvesting header 10 on the feederhouse 12. In the illustrated embodiment, two hydraulic rams 100 connect between the header frame 42 and the feederhouse interface 80. In the illustrated embodiment, one end 102 of the hydraulic ram 100 is connected to a feederhouse bracket 104 mounted on a lower section 106 of the interface plate 82 and the opposing end 108 of the hydraulic ram 100 is attached to a header bracket 110 mounted on the toolbar 30. However, one skilled in the art will understand that the hydraulic rams 100 may connect between other portions of the feederhouse interface 80 and other portions of the header frame 42 to cause pivoting motion about the pivotable connection 88 without departing from the scope of the invention. Desirably, the hydraulic rams 100 are hydraulically operated one-way rams in which the extension of the ram is controlled by the pressure of the hydraulic fluid ported to the body of the ram 100. The hydraulic rams may be of conventional design well understood by those skilled in the art and need not be described in greater detail herein.

Figure 6:
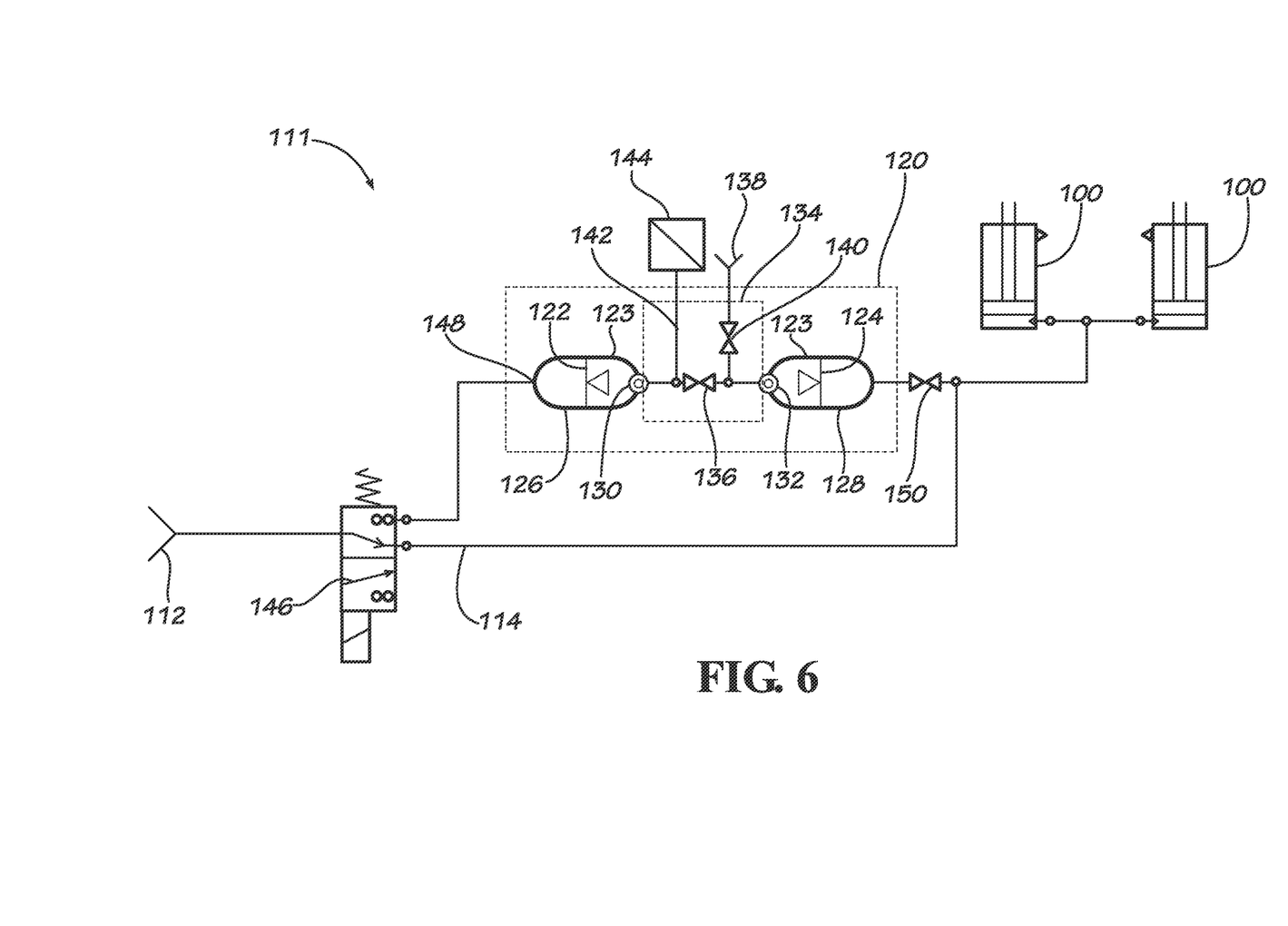
FIG. 6 is a schematic drawing of a hydraulic circuit of the harvesting header of FIG. 1.

FIG. 6 illustrates of a hydraulic circuit 111 associated with the hydraulic rams 100. The hydraulic circuit 111 includes a hydraulic supply 112 that may include one or more hydraulic pumps used to control the pressure of hydraulic fluid in the circuit 111 and hydraulic supply line 114 that ports the hydraulic fluid to the hydraulic rams 100. As hydraulic pressure is increased, the ram 100 extends and the harvesting header 10 pivots relative the feederhouse interface 80 about the pivotable connections 88. The operator may change the angle of the harvesting header 10 with respect to the feederhouse 12 and the ground by controlling the hydraulic supply 112. Desirably, the hydraulic supply 112 may be selectively controlled from the cab of the combine during operations to change the angle of the header 10 based on the conditions encountered by the combine.

The hydraulic circuit 111 also includes a variable precharge accumulator assembly 120 connected between the hydraulic supply 112 and the hydraulic rams 100. As the harvesting header 10 operates close to the ground, the harvesting header 10 may strike uneven terrain that would cause the header frame 42 to bounce against the force of the hydraulic rams 100. The accumulator assembly 120 cushions the load on the hydraulic rams 100 and lessens the shock and stresses caused by such impact by introducing a pressurized gas, preferably nitrogen, into the hydraulic circuit 111. Desirably, the accumulator assembly 120 uses a compressed gas, however spring or other energy storing means may be used without departing from the scope of the invention.

According to the invention, the accumulator assembly 120 has a precharge fluid/gas interface 122 between a gas chamber 123 and the hydraulic supply 112, and a working fluid/gas interface 124 between the gas chamber 123 and the working ram 100. Controlling the precharge enables the operator of the combine to adjust the pressure in the accumulator assembly 120 based on desired stiffness of the header 10 and differing field conditions. In the illustrated embodiment, the precharge fluid/gas interface 122 is formed by a precharge adjusting accumulator 126 and the working fluid/gas interface 124 is formed by a working accumulator 128. The precharge adjusting and working accumulators 126, 128 may use a piston, bladder, or diaphragm to separate the gas from the hydraulic fluid. Gas sides 130, 132 of the precharge adjusting accumulator 126 and the working accumulator 128 are connected by bloc 134 so that gas pressure is substantially the same in the two accumulators 126, 128. Optionally, bloc 134 contains a precharge isolation valve 136 enabling the precharge adjusting accumulator 126 to be isolate from the working accumulator 128 once desired gas pressure is obtained. The bloc 134 desirably also contains a gas supply inlet 138 with a gas supply isolation valve 140 and a port 142 for a pressure transducer 144 capable of reading gas pressure in the accumulator assembly 120 and providing this information to the operator of the combine. While the illustrated embodiment comprises the precharge adjusting accumulator 126 and the working accumulator 128 connected by bloc 134, one skilled in the art will understand that the precharge and working fluid/gas interfaces 122, 124 may be formed by an accumulator having three chambers, with fluid chambers on each side with a gas chamber in the center, without departing from the scope of the invention. In this embodiment, one of the fluid chambers would be on the working side and the other fluid chamber would control the precharge.

A hydraulic supply valve 146 ports hydraulic fluid to the working rams 100 and selectively to a fluid-side 148 of the precharge fluid/gas interface 122. Positioning the hydraulic supply valve 146 to connect the hydraulic supply 112 to the fluid-side 148 of the precharge fluid/gas interface 122 enables the operator to adjust the precharge of the accumulator assembly 120 by adjusting the fluid pressure against the precharge fluid/gas interface 122. This enables the operator to select the gas pressure against the working fluid/gas interface 124 of the accumulator assembly 120. Desirably, the hydraulic supply valve 146 may be selectively controlled from the cab of the combine to change the gas pressure in the accumulator assembly 120 during operations based on the conditions encountered by the combine. Optionally, an accumulator isolation valve 150 is located so at to provide the option of isolating the accumulator assembly 120 from the remaining portions of the hydraulic circuit 111 if operations without an accumulator are desired.

Returning to FIG. 1, the harvesting header also includes a front ground sensor 130 near a leading tip of at least one of the snouts 22 and a rear ground sensor 132 located near the rear of the header 10. Multiple front and rear ground sensors 130, 132 may be used along the length of the header 10. Conventional ground sensors known to those skilled in the art may be used for the front and rear ground sensors 130, 132, and additional detail for such sensors need not be included herein. A header control system 136 shown schematically in FIG. 1 receives a signal from the front ground sensor 130 and the rear ground sensor 132 and provides feedback to control the fore/aft pitch angle of the header 10. The header control system 136 is operable to sense movement of the header 10 as the header 10 moves over uneven terrain and provides an output signal to the hydraulic supply 112. As described above, the hydraulic supply 112 controls the positions of the hydraulic rams 100 and thus the fore/aft pitch angle of the harvesting header 10 relative feederhouse interface 80 and the ground for optimal cutting performance.

The foregoing has broadly outlined some of the more pertinent aspects and features of the present invention. These should be construed to be merely illustrative of some of the more prominent features and applications of the invention. Other beneficial results can be obtained by applying the disclosed information in a different manner or by modifying the disclosed embodiments. Accordingly, other aspects and a more comprehensive understanding of the invention may be obtained by referring to the detailed description of the exemplary embodiments taken in conjunction with the accompanying drawings, in addition to the scope of the invention defined by the claims.

What is claimed is:

1. A harvesting header and feederhouse for use with a crop harvesting machine, the header and feederhouse comprising:
   a feederhouse interface at a distal end of the feederhouse;
   a header frame providing structural support for the harvesting header;
   a pivotable connection between the feederhouse interface and the header frame enabling the header frame to pivot with respect to the feederhouse interface;
   at least one hydraulic ram connected between the feederhouse interface and the header frame to pivot the harvesting header on the feederhouse;
   a hydraulic supply providing pressurized hydraulic fluid to the at least one hydraulic ram; and
   an accumulator assembly fluidically connected between the hydraulic supply and the at least one hydraulic ram, the accumulator assembly having a precharge fluid/gas interface between a gas chamber and the hydraulic supply, and a working fluid/gas interface between the gas chamber and the at least one hydraulic ram.

2. The harvesting header and feederhouse for a crop harvesting machine of claim 1 wherein the precharge fluid/gas interface is formed by a precharge adjusting accumulator and the working fluid/gas interface is formed by a working accumulator and gas sides of the precharge adjusting accumulator and the working accumulator are connected by a bloc.

3. The harvesting header and feederhouse for a crop harvesting machine of claim 1 further comprising a hydraulic supply valve that selectively ports hydraulic fluid to the at least one hydraulic ram and to a fluid-side of the precharge fluid/gas interface.

4. The harvesting header and feederhouse for a crop harvesting machine of claim 1 wherein the gas chamber of the accumulator assembly is situated between the precharge fluid/gas interface and the working fluid/gas interface of the accumulator assembly.

5. The harvesting header and feederhouse for a crop harvesting machine of claim 4 further comprising a hydraulic supply valve configured to selectively port hydraulic fluid to the at least one working ram and to a fluid-side of the precharge fluid/gas interface.

6. The harvesting header and feederhouse for a crop harvesting machine of claim 1 wherein the feederhouse interface comprises an interface plate and first and second mounting flanges on outer sides of the feederhouse interface and extending rearwardly from said interface plate, and wherein the header frame comprising a top beam, a bottom beam, and first and second vertical main structures connecting the top and bottom beams, wherein the first and second mounting flanges fit inside and adjacent to respective first and second vertical main structures of the header frame, and wherein the pivotable connection comprises first and second pivotable connections having a pivot pin disposed in a first cylindrical bore passing through the respective mounting flange and a second cylindrical bore passing through the respective vertical main section, wherein each pivotable connection further comprises a bracket fixedly disposed on the respective vertical main section used to fix the pivot pin to the vertical main section, the pivot pin being free to rotate with respect to the mounting flange, the harvesting header comprising a toolbar mounted on the header frame, the toolbar receiving a plurality of crop harvesting row units, each row unit configured to harvest a row of crop; and wherein the at least one hydraulic ram is connected between the feederhouse interface and the toolbar, wherein one end of the hydraulic ram is connected to a feederhouse bracket mounted on a lower section of the feederhouse interface and the opposing end of the hydraulic ram is attached to a header bracket mounted on the toolbar.

* * * * *